United States Patent
Friebe et al.

(10) Patent No.: US 12,485,818 B2
(45) Date of Patent: Dec. 2, 2025

(54) VEHICLE SURROUND VIEW SYSTEM AND METHOD THEREOF

(71) Applicant: Continental Autonomous Mobility Germany GmbH, Ingolstadt (DE)

(72) Inventors: Markus Friebe, Gefrees (DE); Chetan Gotur, Bangalore (IN); Pavan Nag Prabhakar, Bangalore (IN); Abhishek Ranjan, Bangalore (IN)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 18 days.

(21) Appl. No.: 18/294,899

(22) PCT Filed: Jul. 29, 2022

(86) PCT No.: PCT/EP2022/071317
§ 371 (c)(1),
(2) Date: Feb. 2, 2024

(87) PCT Pub. No.: WO2023/012051
PCT Pub. Date: Feb. 9, 2023

(65) Prior Publication Data
US 2024/0336198 A1    Oct. 10, 2024

(30) Foreign Application Priority Data
Aug. 3, 2021 (GB) .................................. 2111143

(51) Int. Cl.
*B60R 1/23* (2022.01)
*G06V 20/56* (2022.01)

(52) U.S. Cl.
CPC ................ *B60R 1/23* (2022.01); *G06V 20/56* (2022.01); *B60R 2300/105* (2013.01); *B60R 2300/302* (2013.01); *B60R 2300/304* (2013.01)

(58) Field of Classification Search
CPC ................ B60R 1/23; B60R 2300/105; B60R 2300/302; B60R 2300/304; G06V 20/56
See application file for complete search history.

(56) References Cited

U.S. PATENT DOCUMENTS

| | | | |
|---|---|---|---|
| 3,451,749 A * | 6/1969 | Blattner ................. | G03B 15/08 352/81 |
| 10,747,314 B1 * | 8/2020 | Chang ..................... | G06F 3/013 |

(Continued)

FOREIGN PATENT DOCUMENTS

| DE | 112016005392 T5 | 8/2018 |
|---|---|---|
| JP | 2003191810 A | 7/2003 |

(Continued)

OTHER PUBLICATIONS

Chan, Sheng translation of TW 1599989 B Nov. 29, 2016 (Year: 2016).*

(Continued)

*Primary Examiner* — Zaihan Jiang
(74) *Attorney, Agent, or Firm* — Fitch, Even, Tabin & Flannery LLP

(57) ABSTRACT

The present disclosure relates to a method and system for displaying surround view in a vehicle. A first image is captured at a first time instant and a second image is captured at a second time instant, from a camera mounted on the vehicle. The first image is different from the second image. While capturing the first and second images, one or more vehicle motion parameters from one or more sensors associated with the vehicle are received. Further, a corrected image is composed using the first image, the second image and the one or more vehicle motion parameters. Thereafter, the corrected image is displayed on a display unit of the vehicle.

10 Claims, 8 Drawing Sheets

(56) References Cited

U.S. PATENT DOCUMENTS

| | | | |
|---|---|---|---|
| 2016/0209647 A1* | 7/2016 | Fürsich | G02B 27/0075 |
| 2016/0379600 A1* | 12/2016 | Jin | G09G 3/002 |
| | | | 345/667 |
| 2017/0120817 A1 | 5/2017 | Kuehnle | |
| 2018/0361930 A1* | 12/2018 | Levi | B60R 1/30 |
| 2018/0376079 A1 | 12/2018 | Shigemura | |
| 2019/0266416 A1 | 8/2019 | Hung | |
| 2019/0306434 A1* | 10/2019 | Annau | H04N 23/698 |
| 2021/0157135 A1* | 5/2021 | Wells | B60K 35/60 |
| 2021/0178967 A1* | 6/2021 | Berne | G06F 3/013 |

FOREIGN PATENT DOCUMENTS

| | | | | |
|---|---|---|---|---|
| JP | 2006327433 A | | 12/2006 | |
| TW | 1599989 B | * | 9/2017 | G06V 10/771 |
| WO | WO-2017075164 | * | 10/2016 | |
| WO | 2017075164 A1 | | 5/2017 | |

OTHER PUBLICATIONS

United Kingdom Intellectual Property Office Search Report dated May 12, 2022 for the priority application No. GB2111143.0.
The International Search Report and the Written Opinion of the International Searching Authority mailed on Nov. 11, 2022 for the counterpart PCT Application No. PCT/EP2022/071317.
European Examination Report dated Feb. 20, 2025 for the counterpart European Patent Application No. 22 754 886.4.
Notice of Reasons for Refusal proposed Apr. 11, 2025 for the counterpart Japanese Patent Application No. 2024 506689 and machine translation of same.

* cited by examiner

VEHICLE SURROUND VIEW SYSTEM AND METHOD THEREOF

CROSS-REFERENCE TO RELATED APPLICATIONS

The present application is a National Stage Application under 35 U.S.C. § 371 of International Patent Application No. PCT/EP2022/071317 filed on Jul. 29, 2022, and claims priority from United Kingdom Patent Application No. GB2111143.0 filed on Aug. 3, 2021, in the Intellectual Property Office of the United Kingdom, the disclosures of which are herein incorporated by reference in their entireties.

TECHNICAL FIELD

The present disclosure relates in general to automotive camera system. Particularly, but not exclusively, the present disclosure relates to system and method for displaying vehicle surround view.

BACKGROUND

Modern vehicles provide different types of assistance to drivers to increase safety and improve driving experience. Various driver assistance functions include path navigation, autonomous or semi-autonomous driving, vehicle infotainment functions, vehicle surround view functions and the like. Referring to a surround view system of a vehicle, different cameras are installed on the vehicle to capture surrounding views of the vehicle. The surround view system provides a 3D visualization to the driver. Typically, the 3D visualization is a top view composed using the different images captured by the cameras.

Generally, fisheye cameras are used to cover a larger field of view. The fisheye cameras add distortion and the captured images needs to be corrected before rendering to a display screen. However, outer regions of the captured images, from a fisheye camera, are radially distorted and produce low quality when corrected and displayed on the display screen. Hence, there is a need to generate high quality images from the images captured using fisheye cameras.

The information disclosed in this background of the disclosure section is only for enhancement of understanding of the general background and should not be taken as an acknowledgment or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

In one embodiment, a method and system for displaying surround view in a vehicle is disclosed. A first image is captured at a first time instant (t−1) and a second image is captured at a second time instant (t), from a camera mounted on the vehicle. The first image is different from the second image. While capturing the first and second images, one or more vehicle motion parameters from one or more sensors associated with the vehicle are received. Further, a corrected image is composed using the first image, the second image and the one or more vehicle motion parameters. Thereafter, the corrected image is displayed on a display unit of the vehicle.

In an embodiment, the first image and second image are radially distorted. The second image is captured after the vehicle has moved from a position where the first image was captured.

In an embodiment, the one or more vehicle motion parameters includes at least one of a speed of the vehicle and a steering angle of the vehicle.

In an embodiment, the corrected image is composed by identifying a first slice having an undistorted view in the first image where the first slice corresponds to a second slice having a distorted view in the second image. The slice is identified based on the one or more vehicle motion parameters. Further, the corrected image is composed such that the first slice replaces the second slice in the corrected image.

In an embodiment, the corrected image is processed to represent a view selected from a group including a top view of the vehicle, a front view of the vehicle, a side view of the vehicle and a combination thereof. Thereafter, the view of the vehicle is displayed on the display unit.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
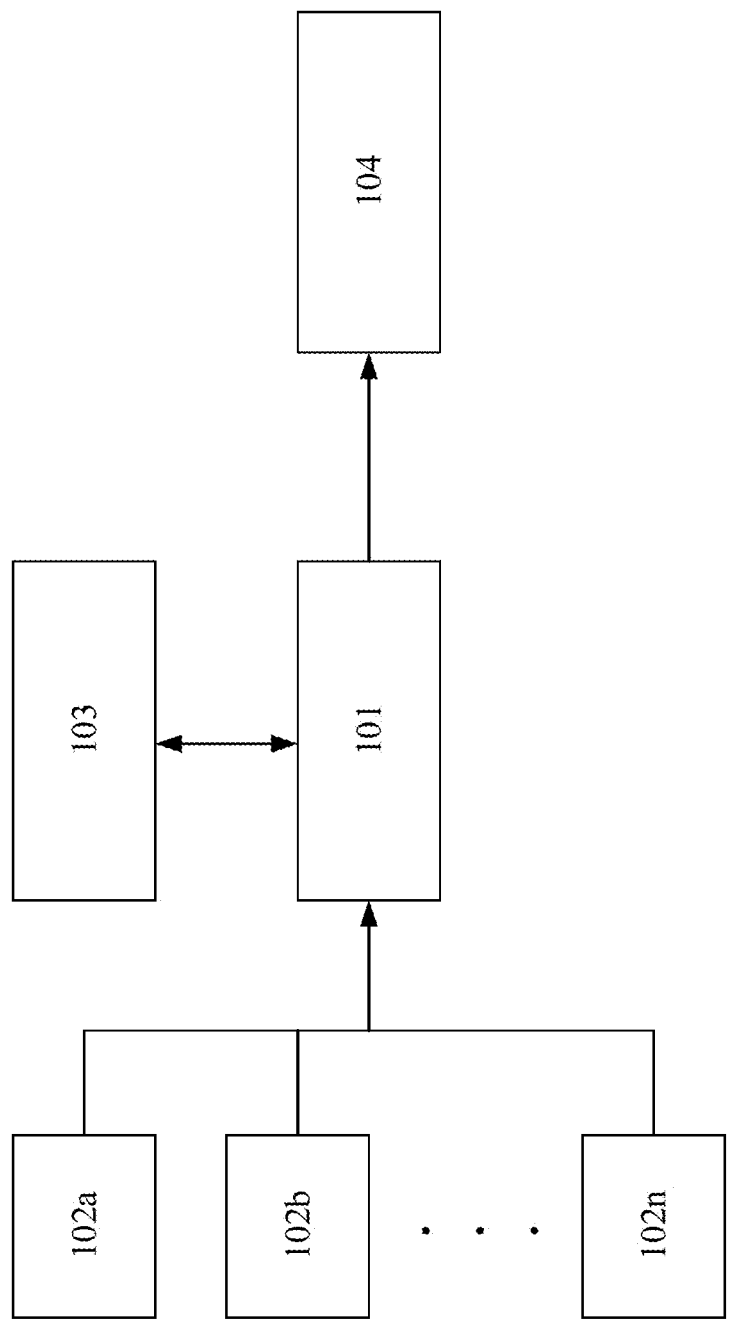
FIG. 1 shows an exemplary block diagram of a vehicle for displaying surround view, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows a block diagram of a vehicle for displaying surround view on a display unit. As shown in the FIG. 1, the block diagram comprises a system 101, a plurality of cameras 102a, 102b, . . . , 102n, an Electronic Control Unit 103, and a display unit 104. The plurality of cameras 102a, 102b, . . . 102n may be fisheye cameras capable of capturing a large field of view. For example, four cameras 102a, 102b, 102c, 102d may be installed on the vehicle to provide 360 degrees view around the vehicle. In an exemplary embodiment, the plurality of cameras 102a, 102b, . . . 102n may be Complementary Metal Oxide Semiconductor (CMOS) cameras with wide dynamic range resolution. Also, the plurality of cameras 102a, 102b, . . . 102n may have a high field of view of at least 180 degrees or more. For example, the fisheye cameras may have a field of view of 195 degrees.

In an embodiment, the ECU 103 may be configured to obtain one or more vehicle motion parameters. The one or more vehicle motion parameters may include at least one of a speed of the vehicle and a steering angle of the vehicle. In some embodiments, the one or more vehicle motion parameters may be obtained by the ECU 103 using sensors (not disclosed in FIG. 1) which are commonly known in the art. For example, the speed of the vehicle may be obtained using a hall effect sensor and the steering angle may be obtained using a steering angle sensor.

In an embodiment, the display unit 104 may be part of an infotainment system (not shown in FIG. 1), a Head-Up Display (HUD) unit of the vehicle, a display of a mobile device or any other display associated with the vehicle. The display unit 104 may comprise its own processing unit, an operating system, and a communication port. The display unit 104 is configured to display a surrounding view of the vehicle provided by the system 101. In some embodiments, the displayed content may be a specific directional view of the vehicle. In some embodiments, the displayed content may be a 3D surround view of the vehicle.

In an embodiment, the system 101 may be a System on Chip (SoC). In some embodiments, the system 101 may be a part of the ECU 103 or may be a stand-alone system. The system 101 may be connected to the ECU 103, the plurality of cameras 102a, 102b, . . . 102n and the display 104 using Ethernet or Controller Area Network (CAN) or FlexRay or Low Voltage Differential Signaling standards.

The system 101 may be configured to receive a first image and a second image captured by a camera 102a from the plurality of cameras 102a, 102b, . . . 102n. The first image and the second image may be temporally distinct, i.e., the first image may be captured at a first time instant (t−1) and the second image may be captured at a second time instant (t) after the first time instant (t). In some embodiments, the first image and the second image may comprise substantially similar objects. Due to temporal movement of the camera may be due to vehicle motion, the objects in the second image may slightly differ from the objects in the first image. For example, the first image may be captured when the vehicle was at point A and the second image may be captured when the vehicle was at point B. Therefore, due to the movement of the vehicle from point A to point B and due to time elapse from (t−1) to (t) the objects in the first image and the second image may slightly vary. In an embodiment, the first image and the second image may be geometrically distorted, for example radially distorted. Due to geometrical distortions, outermost regions of the first image and the second image may be unclear for displaying. Also, the distortions may add processing complexity to detect objects in the images. For example, in a vehicle, while parking, it is essential that all the objects around the vehicle are detected while displaying on the display unit 104. However, due to geometric distortions when the objects are not detected accurately, it can lead to severe damage to the vehicle. The system 101 makes use of the first image and the second image along with the one or more vehicle motion parameters to compensate for the geometrical distortions.

In an embodiment, the system 101 receives the one or more vehicle motion parameters from the ECU 103. The system may configure the camera 102a to capture the first image and the second image based on the one or more vehicle motion parameters. For example, the system 101 configures the camera 102a to capture an image for every 1 m forward motion of the vehicle. Likewise, the system 101 configures the camera 102a to capture an image for every 1 m backward motion of the vehicle. Similarly, the system 101 configures the camera 102a to capture an image for every 1 degree steering of the vehicle. In another example, the system 101 configures the camera 102a to capture an image for every 16 ms when the vehicle is in the forward motion or backward motion. The examples provided in the present disclosure should not be considered as a limitation. The values considered are exemplary only and system can be configured to perform the action for different values.

Further, the system 101 composes a corrected image using the first image, the second image and the one or more vehicle motion parameters and displays the corrected image on the display unit 104. Likewise, the system 101 may compose a corrected image from the plurality of cameras 102a, 102b, . . . , 102n and generate a 3D view of the surroundings of the vehicle and display the 3D view on the display unit 104.

Figure 2:
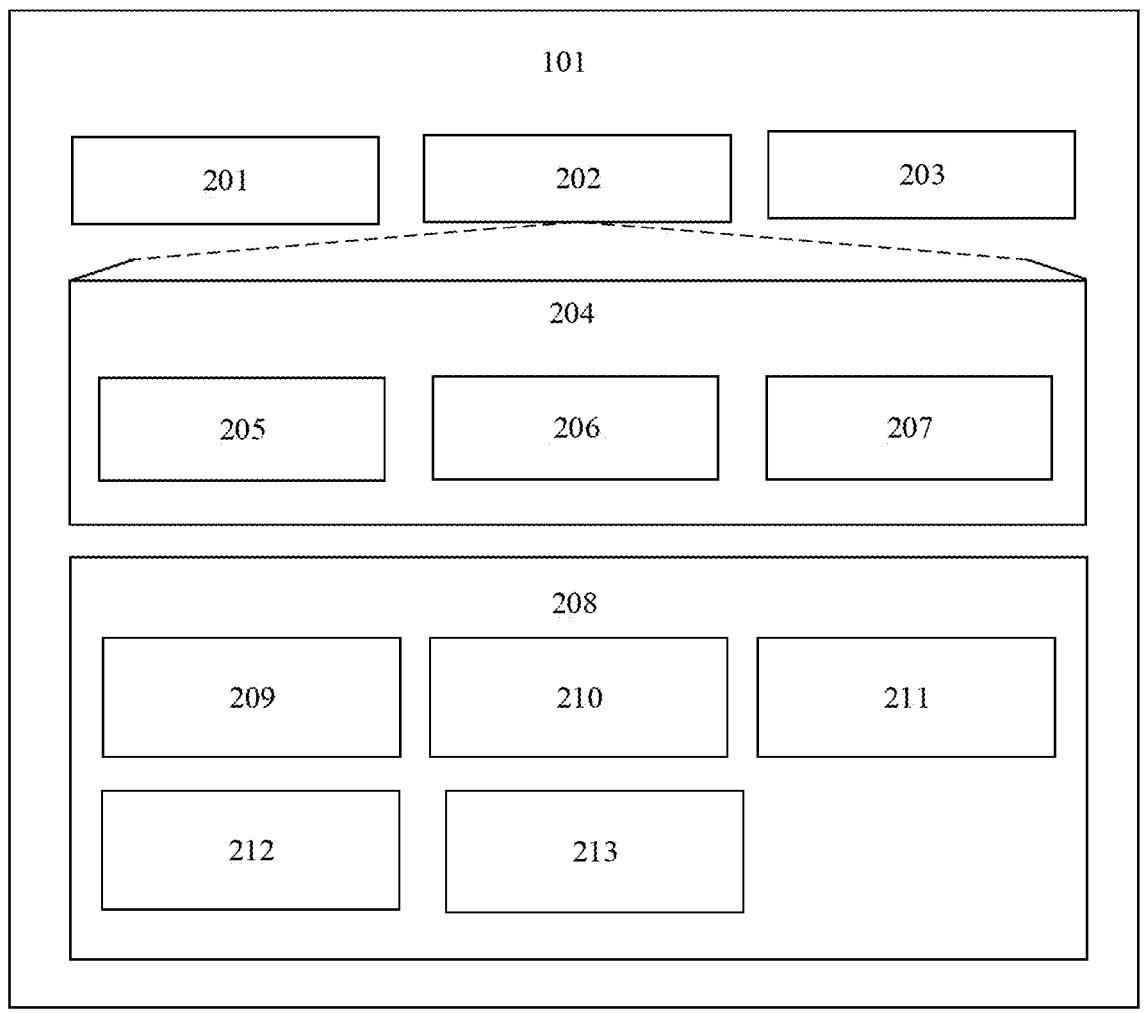
FIG. 2 shows a detailed block diagram of a system for displaying vehicle surround view, in accordance with some embodiments of the present disclosure.

FIG. 2 shows a detailed block diagram of the system 101. The system 101 may include Central Processing Unit ("CPU" or "processor") 203 and a memory 202 storing instructions executable by the processor 203. The processor 203 may include at least one data processor for executing program components for executing user or system-generated requests. The memory 202 may be communicatively coupled to the processor 203. The system 101 further includes an Input/Output (I/O) interface 201. The I/O interface 201 may be coupled with the processor 203 through which an input signal or/and an output signal may be communicated.

In some implementations, the system 101 may include data 204 and modules 209. As an example, the data 204 and modules 208 may be stored in the memory 202 configured in the system 101. In one embodiment, the data 204 may include, for example, image data 205, vehicle motion parameters 206, and other data 207.

In an embodiment, image data 205 may include the first image and the second image. As described above, the first image was captured at time (t−1) and the second image was captured at time (t). In an embodiment, the first image and the second image are stored after applying image corrections. Various image processing techniques may be used to correct geometrical distortions in the first image and the second image.

In an embodiment, the vehicle motion parameters 206 may include speed of the vehicle and a steering angle of the vehicle. The vehicle motion parameters 206 may be obtained from the ECU 103 at regular intervals.

In an embodiment, other data 207 may include image processing parameters for correcting the first image and the second image. Further, the other data 207 may also include image processing parameters for composing a 3D surround view from images obtained from the plurality of cameras 102a, 102b, . . . 102n.

In some embodiments, data 204 may be stored in the memory 202 in form of various data structures. Additionally, the data 204 may be organized using data models, such as relational or hierarchical data models. The other data 207 may store data, including temporary data and temporary files, generated by the modules 208 for performing the various functions of the computing system 102.

In some embodiments, the data 204 stored in the memory 202 may be processed by the modules 208 of the system 101. The modules 208 may be stored within the memory 202. In an example, the modules 208 communicatively coupled to the processor 203 configured in the system 101, may also be present outside the memory 202 as shown in FIG. 2 and implemented as hardware. As used herein, the term modules 208 may refer to an application specific integrated circuit (ASIC), a Field Programmable Gate Array (FPGA), an electronic circuit, a processor 203 (shared, dedicated, or group), and memory 202 that execute one or more software or firmware programs, a combinational logic circuit, and/or other suitable components that provide the described functionality. In some other embodiments, the modules 209 may be implemented using at least one of ASICs and FPGAs.

In one implementation, the modules 208 may include, for example, a communication module 209, an image correction module 210, an image composition module 211, a rendering module 212 and other modules 213. It may be appreciated that such aforementioned modules 208 may be represented as a single module or a combination of different modules 208.

In an embodiment, the communication module 209 is used to communicate with the plurality of cameras 102a, 102b, . . . 102n, the ECU 103 and the display unit 104. The communication module 209 may be an Ethernet module or a CAN module, a FlexRay module or a LVDS module. The communication module 209 is configured to receive the first image and the second image from at least one camera 102a from the plurality of cameras 102a, 102b, . . . , 102n. The communication module 209 may also be used to convey instructions to the plurality of cameras 102a, 102b, . . . , 102n about when to capture the images. In some embodiments, only certain cameras (e.g., 102a) from the plurality of cameras 102a, 102b, . . . 102n may be operated. In such situations, the communication module 209 signals the rest of the cameras to operate in an OFF state or may put the rest of the cameras into a power saving state. In an embodiment, the first image is stored in the memory 202 when the second image is being captured. After the second image is captured, the first image and the second image are processed to derive a corrected image. The communication module 209 may further communicate with the ECU 103 for receiving the vehicle motion parameters 206 and may communicate with the display unit 104 for providing a view (corrected image) of the vehicle (2D or 3D view).

In an embodiment, the image correction module 210 is configured to correct the first image and the second image received from the camera (e.g., 102a) having geometrical distortions. In an embodiment, the first image and the second image may be radially distorted. In an embodiment, the image correction module 210 may use existing techniques to correct the radial distortions in the first image and the second image. Typically barrel type radial distortions occur in fisheye cameras due to its wide-angle lens. Few techniques used to correct radially distorted image includes obtaining 3D coordinates of the distorted image and mapping it to a 2D plane. Few other techniques use images captured from different orientations. Few more techniques use geometric invariants such as lines or vanishing points. In an aspect, the radial distortions may be flattened in the corrected image. However, flattening the image may add noise and may blur the objects present in the outer region of the first image and the second image. In some embodiments, the first image and the second image are processed together to correct the distortions. In some other embodiments, the first image is corrected and saved in the memory 202 while the second image is being captured.

In an embodiment, the image composition module 211 is configured to compose a corrected image using the first image and the second image and the vehicle motion parameters 206. As the invention is performed in real-time, the image composition module 211 retrieves the first image from the memory 202 and obtains the second image from the camera (e.g., 102a). In an embodiment, the image composition module 211 may receive the corrected first image and the corrected second image. Although the images are corrected, distortions may still be present and objects may be blurred. Further, the image composition module 211 identifies a first slice having an undistorted view in the first image and further identifies a corresponding second slice in the second image which is distorted. A slice of an image is a logical fragment of the image. In an embodiment, image slicing techniques may be used to generate the first slice and the second slice. Slicing includes cutting up the image into smaller logical images. For example, an object in the first image may be closer to the vehicle and the same object may be farther in the second image due to forward motion of the vehicle. Therefore, the object may not be distorted in the first image and may be distorted in the second image. Likewise, during reverse motion of the vehicle, the object in the first image may be distorted and the object in the second image may not be distorted. In an embodiment, the first slice and the second slice are based on the vehicle motion parameters 206. In an embodiment, a linear relation between the vehicle movement and pixel distance may be used. For example, the distance travelled by the vehicle between capturing the first image and the second image is determined and corresponding distance is transformed to pixel distance to identify similar objects in the first image and the second image. Thereby, the first slice and the second slice are identified. Further, the image composition module 211 may compose a corrected image by replacing the second slice with the first slice. The same principle may be applied when the vehicle moves in reverse direction or is steered left or right. The vehicle motion parameters 206 are used to determine the slice in the first image and the second image. Therefore, the corrected composed image is free from radial distortions and can be displayed on the display unit 104.

In an embodiment, the image composition module 211 may compose the corrected image for each view (front, rear and sides) using the plurality of cameras 102a, 102b . . . 102n and generate a 3D top view:

In an embodiment, the rendering module 212 is configured to render the corrected composed image on the display unit 104. In an embodiment, the rendering module 212 may perform basic image processing to display on the display unit 104. For example, noise reduction, mapping image resolution to resolution of the display unit 104, setting frame rate for displaying a video, setting image saturation, hue and contrast parameters and the like.

In an embodiment, the other modules 213 may include an object detection module, a driver assist module, a notification module and the like. The object detection module may detect any objects near the vehicle. For example, obstacles near the vehicle may be detected using this module. The driver assist module may assist the driver of the vehicle in navigation. For example, the driver assist module may guide the driver while parking the vehicle. The notification module may notify the driver when an object is detected near the vehicle.

Figure 3:
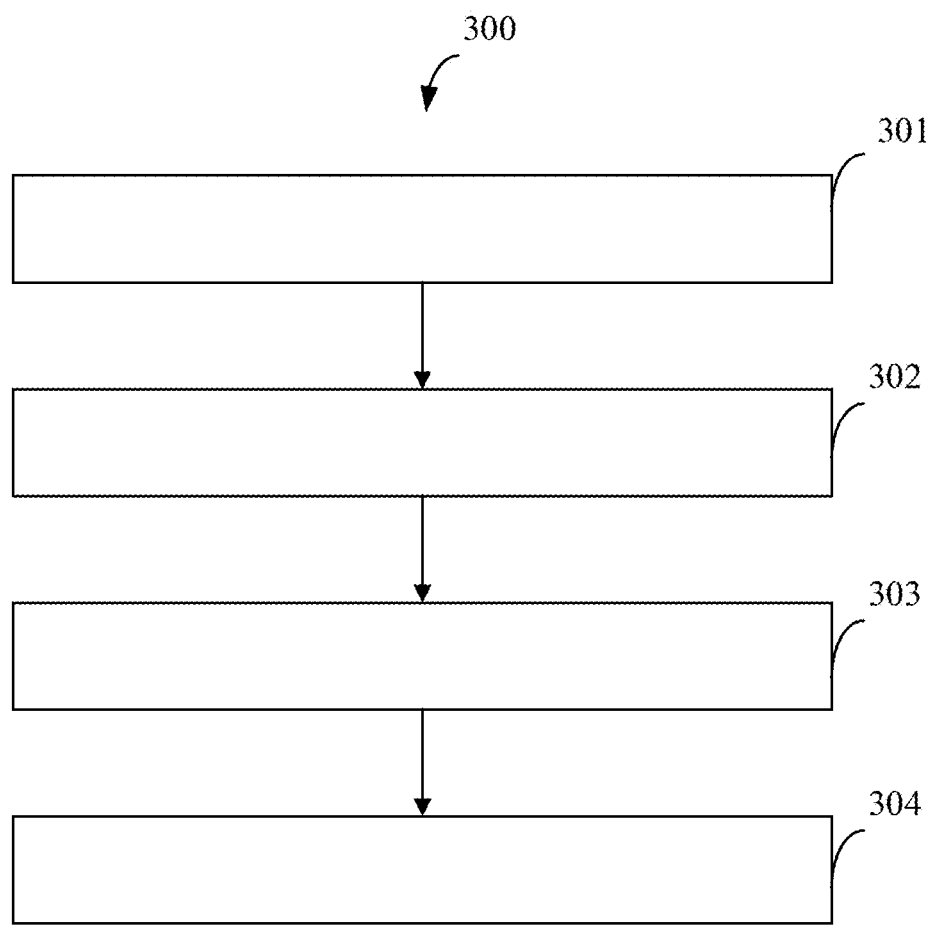
FIG. 3 shows a flowchart illustrating method steps for displaying vehicle surround view, in accordance with some embodiments of the present disclosure.

FIG. 3 shows a flowchart illustrating a method for displaying a vehicle surround view on the display unit 104, in accordance with some embodiment of the present disclosure. The order in which the method 300 may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combinations thereof.

At the step 301, the system 101 receives the first image and the second image captured by a camera (e.g., 102a) at time (t−1) and time (t) respectively. In an embodiment, the system 101 configures the camera 102a to capture the first image and the second image based on the vehicle motion parameters 206. Based on the situation, the system 101 may configure the camera 102a to capture the images. In a scenario, when the vehicle is moving forward, the front camera (e.g., 102b) may be configured to capture images every 1s and the rear camera (e.g., 102a) may be configured to capture images every 3 s. In another scenario when the vehicle is moving in reverse, the front camera 102b may be configured to capture the images every 3 s and the rear camera 102a may be configured to capture the image every 1s. In another scenario, during parking, all the cameras 102, 102b, 102c, 102d may be configured to capture image every 1s. Thus, the system 101 receives the first image and the second image based on the configuration of each camera. As the first image is captured at time (t−1) and the second image is captured at time (t), the two images are different, however comprising substantially similar objects. The similarities in the objects may be due to small movement of the vehicle from a position from time (t−1) to time (t).

Figure 4A:
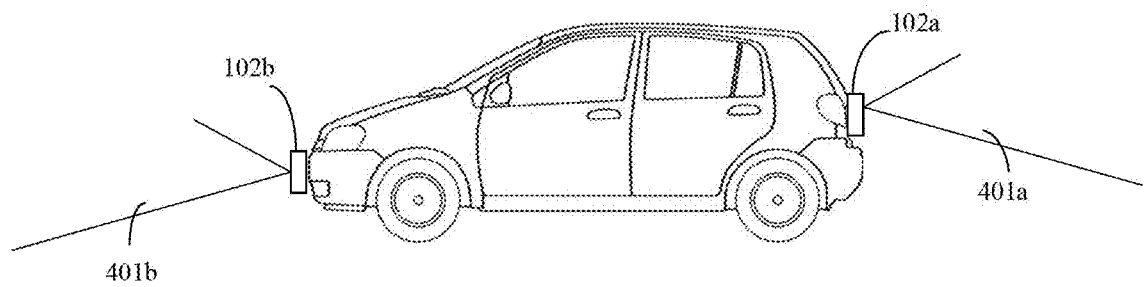
FIG. 4a and FIG. 4b show an exemplary illustration of sensor field of view around a vehicle, in accordance with some embodiments of the present disclosure.
Figure 4B:
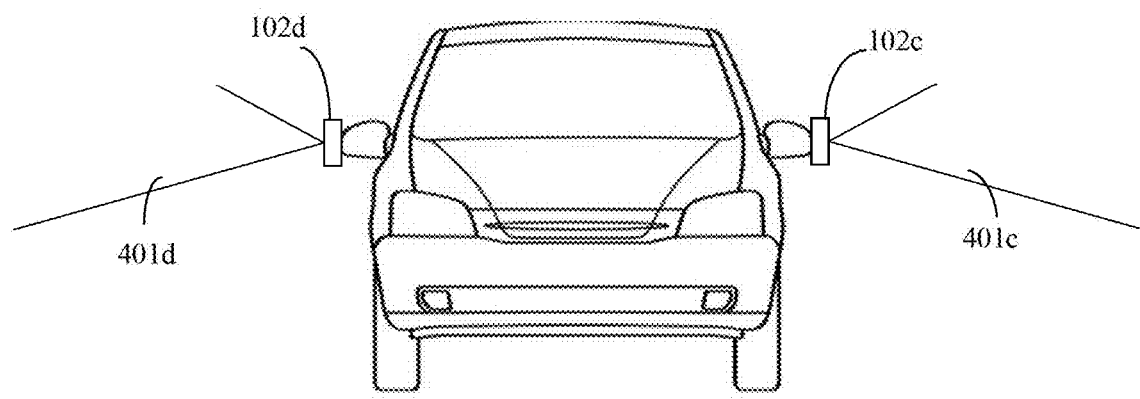
Figure 5A:
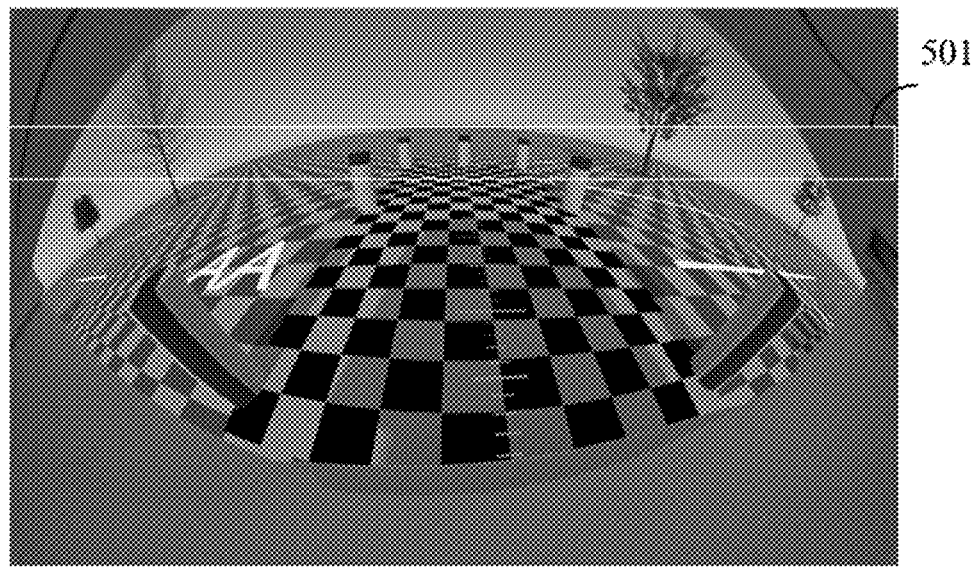
FIG. 5a and FIG. 5b show exemplary temporal visualization of a fisheye camera, in accordance with some embodiments of the present disclosure.
Figure 5B:
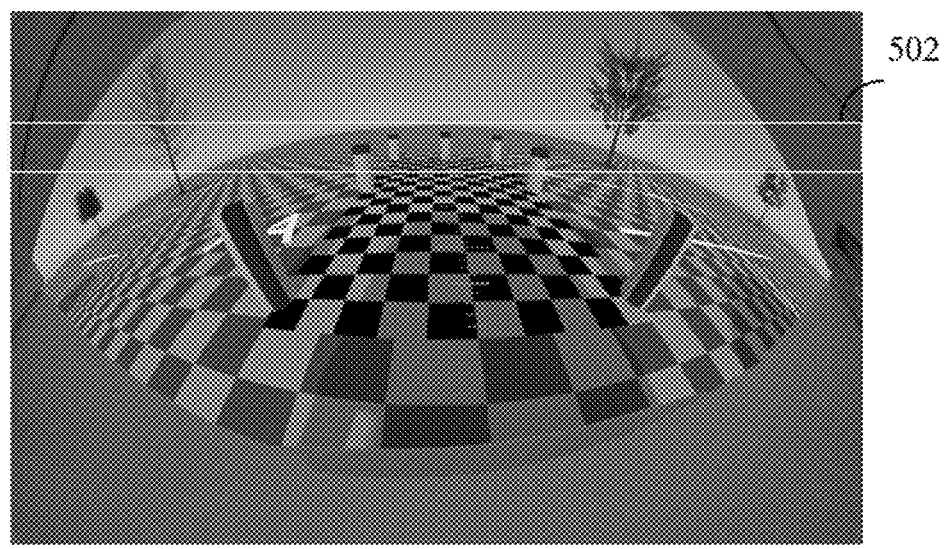

FIG. 4a and FIG. 4b show an exemplary illustration of sensor field of view around a vehicle. In FIG. 4a, a front camera 102b and a rear camera 102a are illustrated. The lines may represent a field of view which is only for illustration and should not be considered as a limitation. The rear camera 102a has a field of view 401a and the front camera 102b has a field of view 401b. FIG. 4b illustrates a scenario where side cameras 102c, 102d are installed on the vehicle. The side camera 102c has a field of view 401c and the side camera 102d has a field of view 401d. The combination of images from the cameras 102a, 102b, 102c and 102d are used to generate a surround view: FIG. 5a and FIG. 5b show exemplary temporal visualization of a fisheye camera. FIG. 5a and FIG. 5b illustrates a rear fisheye camera view of the first image and the second image respectively. As seen, the objects in the region 501 in the FIG. 5a is closer to the vehicle and the objects in the region 502 in the FIG. 5b is farther from the vehicle. This indicates that the vehicle has moved forward from the time the first image was captured. Further, the first image and the second image are radially distorted.

At step 302, the system 101 receives the vehicle motion parameters 206 from the ECU 103 which in turn receives them from other sensors as described previously. In one embodiment, the vehicle motion parameters 206 may be received at regular intervals of time or at regular intervals of distance travelled by the vehicle. For example, the speed of the vehicle and the steering angle may be received every 2 s or for every 10 m the vehicle has travelled. The reception of the vehicle motion parameters 206 may depend on a scenario of the vehicle. For example, while parking the vehicle, the vehicle motion parameters 206 may be received every 50 ms, and while the vehicle is in a freeway, the vehicle motion parameters 206 may be received every 1s.

Figure 6A:
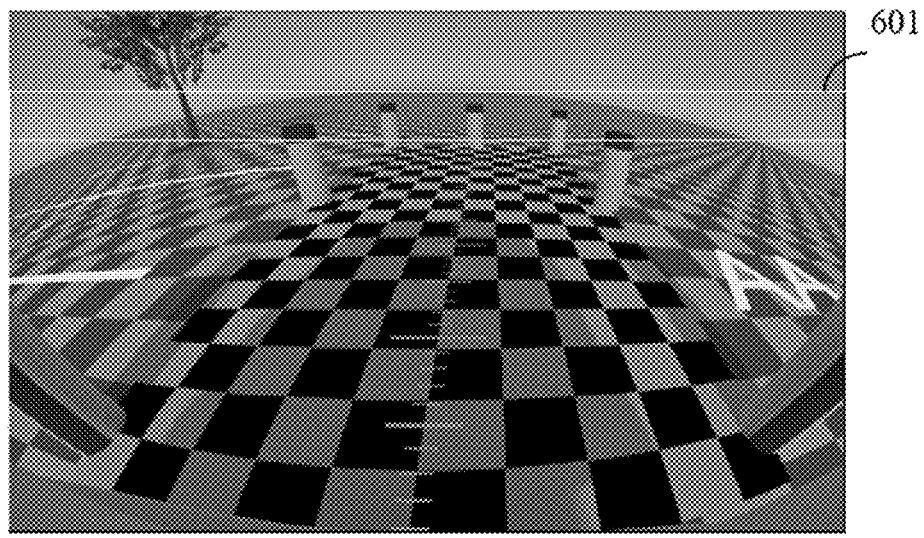
FIG. 6a and FIG. 6b show exemplary temporal visualizations of radial distortions corrected images, in accordance with an embodiment of the present disclosure.
Figure 6B:
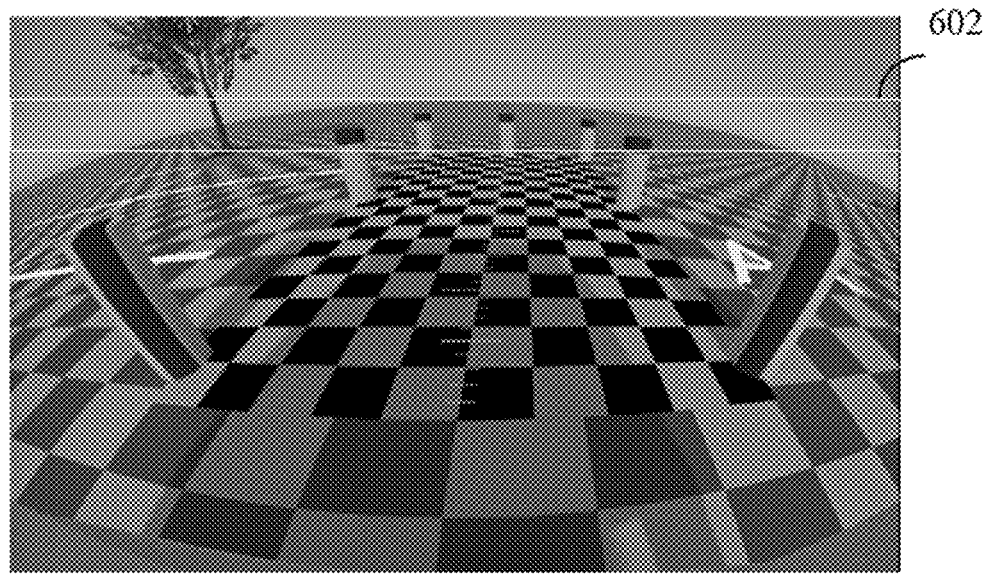

At step 303, the system 101 composes a corrected image using the first image, the second image and the vehicle motion parameters 206. As the first and the second image comprises radial distortions, the system 101 processes the images to remove or decrease the effect of distortions. Image flattening techniques such as mapping 3D image space to 2D space may be employed. Other techniques such as using patterns obtained from different orientations to generate a corrected image. Still another technique may use distortion models to estimate distortion parameters for generating the corrected image. In an embodiment, any existing technique may be employed for generating the corrected first image and the corrected second image. Further, the system 101 composes a single corrected image using the corrected first image, the corrected second image and the vehicle motion parameters 206. The system 101 identifies the first slice in the corrected first image which has an undistorted view and the second slice in the corrected second image having a distorted view: The region in the first slice corresponds to the region in the second slice, i.e., the objects in the first slice may be substantially similar to the objects in the second slice. FIG. 6a and FIG. 6b show exemplary temporal visualizations of radial distortions corrected images As seen in FIG. 6a, the slice 601 denotes a region in the corrected first image which does not have distortions. However, in the FIG. 6b the slice 602 of the corrected second image has distortions. As described, in an image captured by the fisheye camera, generally farther objects may be distorted as the farther objects tend to curve. Further, when the vehicle is close to an object, the object may appear clear (without distortions) and when the vehicle moves away from the object, the object may appear distorted. Hence, the proposed solution uses both images for composing the corrected image. The system 101 then correlates the vehicle motion parameters 206 and the second image to determine how much distance the vehicle has travelled after capturing the first image, which direction has the vehicle travelled, and how much angle the vehicle has been steered after capturing the first image. This determination provides the system 101 information to identify the first slice 601 and the second slice 602.

In an embodiment, a plurality of images captured at small time intervals may also be used to compose the corrected single image. For example, five images captured at different time intervals may be stitched together to compose the corrected image. For instance, a first image captured at first time instance (t), a second image captured at a second time instance (t+1), a third image captured at a third time instance (t+2) and a fourth image captured at a fourth time instance (t+3) may be stitched together. In one embodiment, the time instance may be determined based on the vehicle ego parameters. The time instance may be determined based on the vehicle motion parameters. The number of images required to stitch together may be based on the distortions in the image. If a fisheye camera introduces distortions closer to the center of the images, more number of images may be required. Further, the temporal images are also based on the movement of the vehicle. The above scenarios are described when the vehicle is moving forward and considering the fisheye camera is installed at the rear side of the vehicle. While the vehicle is moving in the reverse direction, the objects behind the vehicle move closer to the vehicle and the first slice may have distorted regions and the second slice may have corresponding undistorted regions. Likewise, based on the movement of the vehicle, the system 101 determines the analogy of identifying the slices in the images to stitch together. In an embodiment, the slices 601 and 602 are identified further based on the vehicle motion parameters 206. For example, when the first image is captured, it is stored in the memory 202.

Further, the system 101 replaces the second slice 602 with the first slice 601 and composes the corrected image without distortions. In an embodiment, the system 101 may use image stitching techniques to replace the second slice 602 with the first slice 601. The composed corrected image is free of distortions and the objects appear clear without blur as well.

Figure 7:
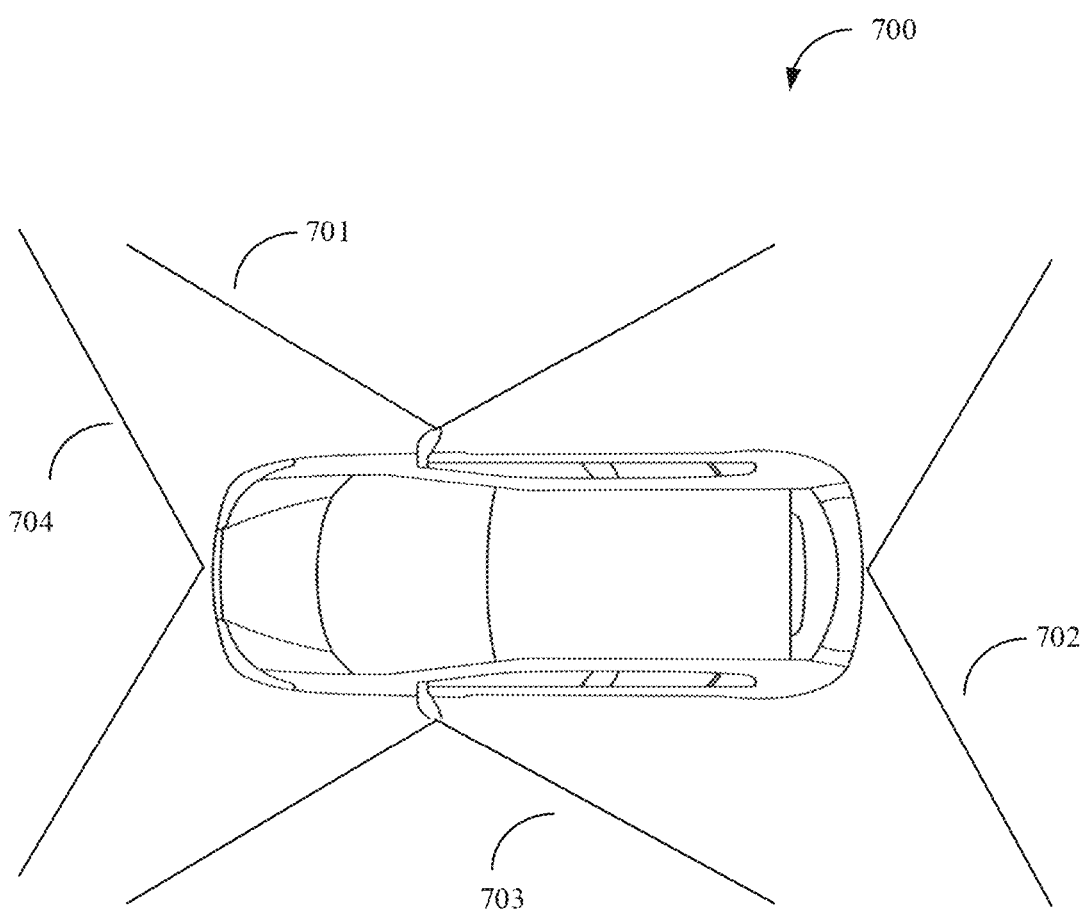
FIG. 7 illustrates an exemplary top surround view of a vehicle, in accordance with some embodiments of the present disclosure.

Referring back to FIG. 3, at step 304, the system 101 displays the corrected composed image on the display unit 104. In an embodiment the system 101 may display the corrected composed view of one side (rear view or front view or left view or right view) of the vehicle or the corrected composed view of all the sides of the vehicle (surround view). In one embodiment, the system 101 may stitch the corrected composed images generated for all sides (front, rear, left and right) and render the surround view of the vehicle on the display unit 104. FIG. 7 shows an exemplary illustration of a top surround view 700 of the vehicle. Likewise, a perspective view may also be provided. In an embodiment, existing techniques may be used to generate the top surround view 700. For example, four perspective images (matrices) may be obtained and transform into a 2D ground plane, as top view provides a 2D visualization. In FIG. 7, top surround view 700 is obtained by stitching four top views 701, 702, 703 and 704 each obtained by processing respective sensor data. In one embodiment, the stitching is performed such that overlapping regions are considered for reference and the images are stitched at the overlapping regions. For stitching, the camera placement may be considered or the images itself may be processed to determine the overlapping regions. In overlapping regions, the data are either blended or data from one of the image is considered. Further, the surround top view is displayed on the display unit 104.

In an embodiment, the proposed solution helps in driver assist systems as objects are clearly identified and displayed. Further, parking the vehicle is more convenient as obstacles are clearly detected. Furthermore, driving experience is enriched due to clear display of surroundings. High quality of composed information of the surroundings are provided in 3D visualization. The composed corrected image comprise greater pixel density compared to existing techniques.

Computer System

Figure 8:
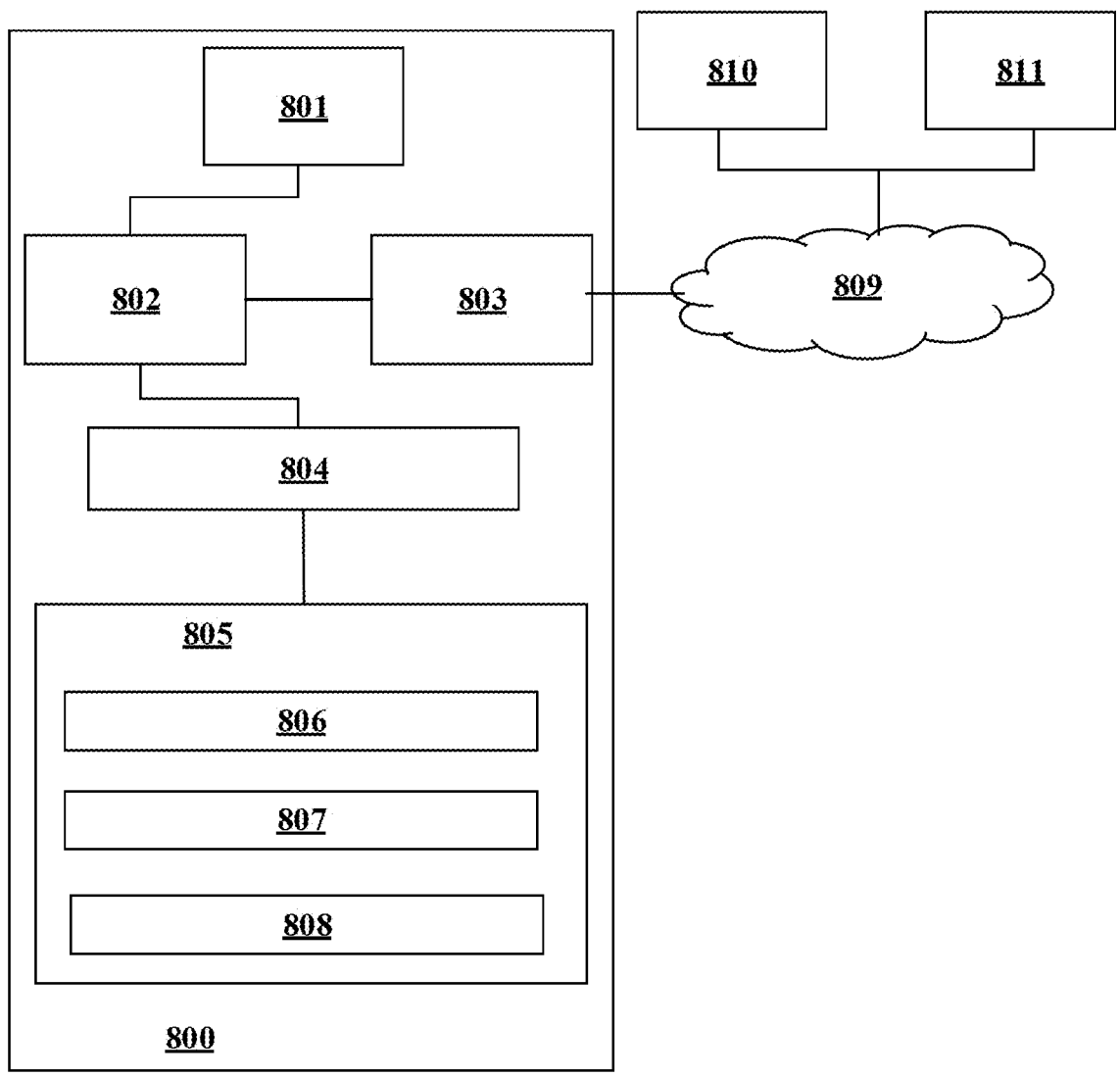
FIG. 8 shows a general-purpose computer system for displaying vehicle surround view; in accordance with embodiments of the present disclosure.

FIG. 8 illustrates a block diagram of an exemplary computer system 800 for implementing embodiments consistent with the present disclosure. In an embodiment, the computer system 800 may be used to implement the method of generating filter sequences to train the model. The computer system 800 may comprise a central processing unit ("CPU" or "processor") 802. The processor 802 may comprise at least one data processor for executing program components for dynamic resource allocation at run time. The processor 802 may include specialized processing units such as integrated system (bus) controllers, memory management control units, floating point units, graphics processing units, digital signal processing units, etc.

The processor 802 may be disposed in communication with one or more input/output (I/O) devices (not shown) via I/O interface 801. The I/O interface 801 may employ communication protocols/methods such as, without limitation, audio, analog, digital, monoaural, RCA, stereo, IEEE-(1394), serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the computer system 800 may communicate with one or more I/O devices. For example, the input device 810 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 811 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 800 is connected to the service operator through a communication network 809. The processor 802 may be disposed in communication with the communication network 809 via a network interface 803. The network interface 803 may communicate with the communication network 809. The network interface 803 may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network 809 may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface 803 and the communication network 809, the computer system 800 may communicate with the one or more service operators.

In some embodiments, the processor 802 may be disposed in communication with a memory 805 (e.g., RAM, ROM, etc. not shown in FIG. 7 via a storage interface 804. The storage interface 804 may connect to memory 805 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user interface 806, an operating system 807, web server 808 etc. In some embodiments, computer system 800 may store user/application data 806, such as the data, variables, records, etc. as described in this disclosure. Such databases may be implemented as fault-tolerant, relational, scalable, secure databases such as Oracle or Sybase.

The operating system 807 may facilitate resource management and operation of the computer system 800. Examples of operating systems include, without limitation, APPLE®; MACINTOSH®; OS X®, UNIX®, UNIX-like system distributions (E.G., BERKELEY SOFTWARE DISTRIBUTION® (BSD), FREEBSD®, NETBSD®, OPENBSD, etc.), LINUX®: DISTRIBUTIONS (E.G., RED HAT®, UBUNTU®, KUBUNTU®, etc.), IBM®OS/2®, MICROSOFT®; WINDOWS®; (XP®, VISTA®/7/8, 10 etc.), APPLE® IOS®; GOOGLE™ ANDROID™, BLACKBERRY®; OS, or the like.

In some embodiments, the computer system 800 may implement a web browser (not shown in Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 808 may utilize facilities such as AJAX, DHTML, ADOBE® FLASH®, JAVASCRIPT®, JAVA®, Application Programming Interfaces (APIs), etc. In some embodiments, the computer system 800 may implement a mail server stored program component. The mail server may be an Internet mail server such as Microsoft Exchange, or the like. The mail server may utilize facilities such as Active Server Pages (ASP), ACTIVEX®, ANSI®; C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT®; Exchange, Post Office Protocol (POP), Simple Mail Transfer Protocol (SMTP), or the like. In some embodiments, the computer system 800 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory 805 on which information or data readable by a processor 802 may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In an embodiment, the computer system 800 may comprise remote devices 812. The computer system 800 may receive the first model 104, the second model 105, and the dataset 103 from the remote devices 812 through the communication network 809.

The terms "an embodiment", "embodiment", "embodiments", "the embodiment", "the embodiments", "one or more embodiments", "some embodiments", and "one embodiment" mean "one or more (but not all) embodiments of the present disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the present disclosure.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The illustrated operations of FIG. 3 and FIG. 5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the present disclosure is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 101 | System |
| 102 | Cameras |
| 103 | ECU |
| 104 | Display unit |
| 201 | I/O Interface |
| 202 | Memory |
| 203 | Processor |
| 204 | Data |
| 205 | Image data |
| 206 | Vehicle motion parameters |
| 207 | Other data |
| 208 | Modules |
| 209 | Communication module |
| 210 | Image correction module |
| 211 | Image composition module |
| 212 | Rendering module operator |
| 213 | Other modules |
| 501, 502, 601, 602 | Image slices |
| 800 | Computer System |
| 801 | I/O interface |
| 802 | Processor |
| 803 | Network Interface |
| 804 | Storage Interface |
| 805 | Memory |
| 806 | User Interface |
| 807 | Operating System |
| 808 | Web Server |

-continued

| Reference number | Description |
| --- | --- |
| 809 | Communication Network |
| 810 | Input Device |
| 811 | Output Device |
| 812 | Remote Devices |

What is claimed is:

1. A method of displaying surround view in a vehicle, the method comprises:
    receiving a first image captured at a first time instant and a second image captured at a second time instant, from a camera mounted on the vehicle, wherein the first image is different from the second image;
    receiving one or more vehicle motion parameters from one or more sensors associated with the vehicle;
    composing a corrected image using the first image, the second image and the one or more vehicle motion parameters;
    displaying the corrected image on a display unit of the vehicle;
    wherein composing the corrected image comprises:
    identifying a first slice having an undistorted view in the first image wherein the first slice corresponds to a second slice having a distorted view in the second image, wherein identifying the first slice and the second slice are based on the one or more vehicle motion parameters, wherein the first slice is a first portion of the first image and the second slice is a portion of the second image; and
    composing the corrected image such that the first slice replaces the second slice in the corrected image.

2. The method of claim 1, wherein the first image and the second image are radially distorted.

3. The method of claim 1, wherein the second image is captured after the vehicle has moved from a position where the first image was captured.

4. The method of claim 1, wherein the one or more vehicle motion parameters comprises at least one of a speed of the vehicle or a steering angle of the vehicle.

5. The method of claim 1, wherein the corrected image is processed to represent a view selected from a group comprising at least one of a top view of the vehicle, a front view of the vehicle, a rear view of the vehicle, or a side view of the vehicle, wherein the view of the vehicle is displayed on the display unit.

6. A system for displaying surround view in a vehicle, the system comprises:
    a memory; and
    a processor communicatively coupled to the memory, the processor configured for:
    receiving a first image captured at a first time instant and a second image captured at a second time instant, from a camera mounted on the vehicle, wherein the first image is different from the second image;
    receiving one or more vehicle motion parameters from one or more sensors associated with the vehicle;
    composing a corrected image using the first image, the second image and the one or more vehicle motion parameters;
    displaying the corrected image on a display unit of the vehicle;
    wherein composing the corrected image comprises:
    identifying a first slice having an undistorted view in the first image wherein the first slice corresponds to a second slice having a distorted view in the second image, wherein identifying the first slice and the second slice are based on the one or more vehicle motion parameters, wherein the first slice is a first portion of the first image and the second slice is a portion of the second image; and composing the corrected image such that the first slice replaces the second slice in the corrected image.

7. The system of claim 6, wherein the processor receives first image and the second image comprising radial distortions.

8. The system of claim 6, wherein the processor controls the camera to capture the second image after the vehicle has moved from a position where the camera captured the first image.

9. The system of claim 6, wherein one or more sensors are configured to measure at least one of a speed of the vehicle and a steering angle of the vehicle.

10. The system of claim 6, wherein the processor processes the corrected image to represent a view from a group comprising at least one of a top view of the vehicle, a front view of the vehicle, a rear view of the vehicle, or a side view of the vehicle, wherein the view of the vehicle is displayed on the display unit.

* * * * *